United States Patent
Vickers, Jr. et al.

(10) Patent No.: US 6,849,199 B2
(45) Date of Patent: Feb. 1, 2005

(54) SNOW AND ICE-MELTING GRANULES AND METHOD FOR PREPARING SAME

(75) Inventors: Davis R. Vickers, Jr., Batesville, AR (US); Thomas P. McGonigle, McLean, VA (US)

(73) Assignee: Global Specialty Chemicals LLC, McLean, VA (US)

( * ) Notice: Subject to any disclaimer, the term of this patent is extended or adjusted under 35 U.S.C. 154(b) by 0 days.

(21) Appl. No.: 10/347,945

(22) Filed: Jan. 21, 2003

(65) Prior Publication Data

US 2003/0146409 A1 Aug. 7, 2003

Related U.S. Application Data

(60) Provisional application No. 60/351,280, filed on Jan. 22, 2002.

(51) Int. Cl.$^7$ .............................. C09K 3/18; C01D 3/22; C01B 9/02
(52) U.S. Cl. ..................... 252/70; 106/13; 106/286.6; 106/286.7; 241/3; 423/463; 423/497; 423/498; 423/499.1; 423/499.3; 423/499.4; 428/402
(58) Field of Search ............................. 106/13, 286.6, 106/286.7; 241/3; 252/70; 423/463, 497, 498, 499.1, 499.3, 499.4; 428/402

(56) References Cited

U.S. PATENT DOCUMENTS 3,906,140 A    9/1975   Capes

FOREIGN PATENT DOCUMENTS

| DE | 2200221 A | 7/1973 |
|---|---|---|
| DE | 3028372 A | 2/1982 |
| FR | 2416979 A | 9/1979 |
| RU | 2044118 | 9/1995 |

OTHER PUBLICATIONS

Adams, Franklin S., "Highway Salt: Social and Environmental Concerns", Pennsylvania State University, pp. 3–9, 12 (no date).

Keyser, J. Hode, "De–Icing Chemicals and Abrasives: State of the Art", Control and Research Laboratory, pp. 36–46, Montreal (no date).

McElroy, A. D. et al., "Comparative Study of Chemical Deicers", Transporation Research Record 1157, pp. 1–11 (no date).

Carr, Francis H. et al., "How Massachusetts Cut Salt Use and Costs", Better Roads, Jan. 1992.

*Primary Examiner*—Anthony J. Green
(74) *Attorney, Agent, or Firm*—Holland & Bonzagni, P.C.; Mary R. Bonzagni, Esq.

(57) ABSTRACT

Snow and ice-melting granules prepared from compacted blends of salts of alkali and/or alkaline earth metals and a method for preparing such granules, are provided. The inventive granules have improved mechanical properties and, as such, are not readily reduced to a powder when subjected to mechanical loadings during transit and storage. In a preferred embodiment, the inventive granules employ one or more corrosion inhibitors homogeneously distributed throughout the granules.

23 Claims, 4 Drawing Sheets

SNOW AND ICE-MELTING GRANULES AND METHOD FOR PREPARING SAME

RELATED APPLICATION

This application claims priority from U.S. Provisional Patent Application Ser. No. 60/351,280, filed Jan. 22, 2002.

FIELD OF THE INVENTION

The present invention generally relates to granules for melting snow and ice on surfaces such as streets, parking lots, sidewalks, etc., and more particularly relates to granules prepared from compacted blends of salts of alkali and/or alkaline earth metals and to a method for preparing such granules.

BACKGROUND OF THE INVENTION

Prior art products for melting snow and ice include hygroscopic salts such as calcium chloride and magnesium chloride, rock salt (sodium chloride), fertilizers such as potassium chloride and urea, mixtures of these various salts, and non-slip aggregates such as sand, cinders and calcined diatomaceous earth absorbents.

These prior art products, which are incapable of melting snow and ice in their solid form, must first form a liquid solution or brine. The brine serves to lower the freezing point of water and to dissolve or melt snow and ice on contact, until such time that it becomes diluted to a concentration where its freezing point is raised near that of water.

As will be readily appreciated by those skilled in the art, the speed or effectiveness of these prior art products depends, in part, on the time needed for a brine to form. In order to reduce the brine conversion time, hygroscopic salts (e.g., calcium chloride, magnesium chloride) have been combined with e.g. sodium chloride and/or potassium chloride and urea. These prior art salt blends have been prepared as dry blends and as agglomerates. These blends have also been prepared by spraying a liquid solution of calcium chloride and/or magnesium chloride onto sodium chloride crystals.

Dry salt blends comprising calcium chloride and sodium chloride tend to be the least effective salt blend products due to the separation of these components during shipping. As is well known, calcium chloride has a strong exothermic heat of dissolution while sodium chloride has an endothermic heat of dissolution. As such, dissolution of sodium chloride will occur only with absorption of heat and is therefore dependant upon the heat released by the dissolution of calcium chloride. If these components are not in direct contact, then the sodium chloride dissolution rate is lowered rendering the blend less effective.

The coated sodium chloride crystals and salt blend agglomerates noted above, typically do not contain sufficient quantities of calcium chloride and/or magnesium chloride to achieve acceptable dissolution rates, or to effect complete dissolution of the sodium chloride crystals.

Included among the prior art attempts to improve upon the effectiveness of existing snow and ice-melting products was a granulated product prepared from a compacted 50/50 blend of calcium chloride and sodium chloride. The blend was reportedly prepared using anhydrous calcium chloride pellets (94% $CaCl_2$//4% other salts//2% $H_2O$) and 100 mesh sodium chloride particles (92% of NaCl//8% of a 38% by weight (wt.), $CaCl_2$ solution). The total amount of free water in the anhydrous calcium chloride pellets and calcium chloride solution was 2%.

While this granulated product contained sufficient quantities of calcium chloride to effect dissolution of the sodium chloride component at acceptable dissolution rates, it was expensive to manufacture and was readily reduced to a powder when subjected to mechanical loadings during transit and storage.

Accordingly, it is a primary object of the present invention to address the above-referenced disadvantages of the prior art.

More particularly, it is an object of the present invention to provide snow and ice-melting granules that have improved mechanical properties, yet are less expensive to manufacture.

It is another object of the present invention to provide a method for preparing snow and ice-melting granules that is efficient and economical and that serves to effect an increase in the mechanical properties of the final granule composition.

It is yet a further object of the present invention to provide granules prepared in accordance with the method described herein.

SUMMARY

The present invention therefore provides snow and ice-melting granules prepared from a compacted blend of salts of alkali and/or alkaline earth metals, wherein the blend comprises: from about 15 to about 45% by dry weight, based on the total dry weight of the compacted blend, of a first alkali or alkaline earth metal salt; and from about 85 to about 55% by dry weight, based on the total dry weight of the compacted blend, of a second alkali or alkaline earth metal salt, wherein at least the first salt is a hygroscopic salt, and wherein the sum of the components total 100% by dry weight.

The present invention also provides a method for preparing such granules, which comprises:

(a) mixing at least two salts of alkali and/or alkaline earth metals, wherein a first salt is an anhydrous, hygroscopic salt and wherein a second salt is in the form of a saturated salt solution having a free water content ranging from about 6 to about 10% by wt., based on the total weight of the saturated salt solution;

(b) compacting the mixture; and (c) granulating the compacted mixture.

The present invention further provides snow and ice-melting granules prepared in accordance with the method detailed immediately hereinabove.

The foregoing and other features and advantages of the present invention will become more apparent from the following description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

DETAILED DESCRIPTION OF THE PREFERRED EMBODIMENT

Figure 1:
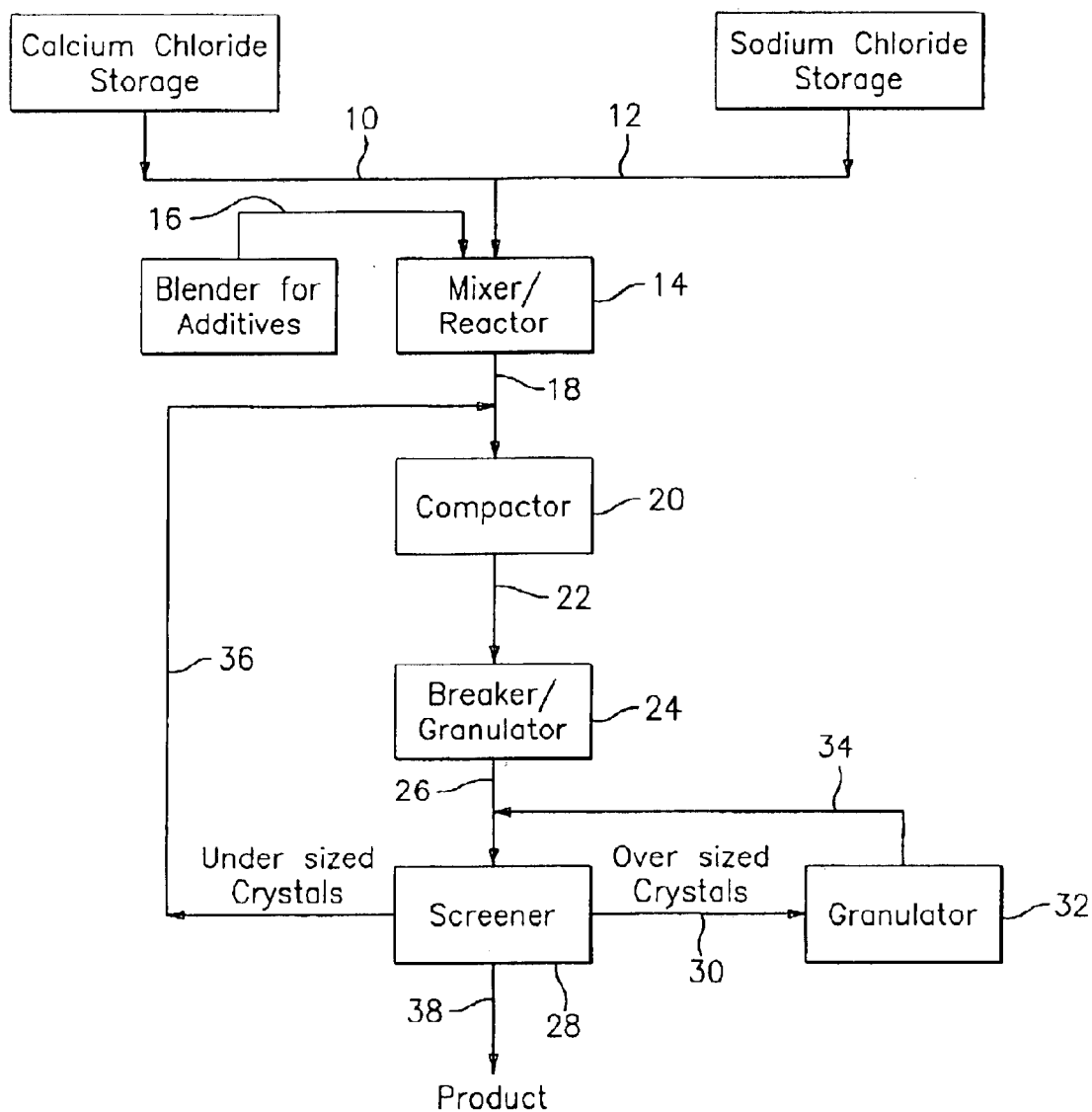
FIG. 1 is a schematic process flow diagram depicting the main features of the method for preparing one example of the snow and ice-melting granules of the present invention.

The snow and ice-melting granules of the present invention have improved mechanical properties and, as such, are not readily reduced to a powder when subjected to mechanical loadings during transit and storage. The inventive granules do not cake, are effective at temperatures as low as −20° C., and penetrate deeper than some prior art deicers through ice to underlying surfaces. In addition, preliminary studies indicate that the granules may act initially as abrasives, reducing the hazardous nature of ice and/or snow-covered surfaces upon contact.

In general, the inventive snow and ice-melting granules are prepared from a compacted blend of at least two salts of alkali and/or alkaline earth metals. More specifically, the inventive granules are prepared from a compacted blend comprising: from about 15 to about 45% by dry weight, based on the total dry weight of the compacted blend, of a first alkali or alkaline earth metal salt; and from about 85 to about 55% by dry weight, based on the total dry weight of the compacted blend, of a second alkali or alkaline earth metal salt, wherein at least the first salt is a hygroscopic salt, and wherein the sum of the components total 100% by dry weight. As alluded to above, one or more hygroscopic salts are employed in the present invention to facilitate the formation of liquid brine.

By way of the present invention, it has been discovered that for granulated calcium chloride/sodium chloride compacted blends, the calcium chloride component must be present in an amount greater than or equal to 15% by dry weight, based on the total dry weight of the compacted blend, in order to effect rapid and complete dissolution of the sodium chloride component. As will be readily appreciated, the relatively low amounts of calcium chloride used in the inventive granulated blends renders these blends more economical or cost-effective.

Preferably, the alkali and alkaline earth metal salts are halide salts selected from the group including calcium chloride, magnesium chloride, potassium chloride and sodium chloride. More preferably, the first alkali and/or alkaline earth metal salt is selected from the group including calcium chloride and magnesium chloride, while the second alkali and/or alkaline earth metal salt is selected from the group including potassium chloride and sodium chloride.

In yet a more preferred embodiment, the snow and ice-melting granules of the present invention are prepared from a compacted blend comprising of from about 20 to about 25% by dry weight (most preferably from about 20 to about 22% by dry weight), based on the total dry weight of the compacted blend, of calcium chloride, and from about 80 to about 75% by dry weight (most preferably from about 80 to about 78% by dry weight), based on the total dry weight of the compacted blend, of sodium chloride.

The inventive snow and ice-melting granules may advantageously contain other additives provided any such additive does not adversely impact upon the desirable properties of the granules. For example, the inventive granules may contain absorbents, abrasives, anti-caking agents, colorants, corrosion inhibitors, preservatives and/or surface active agents.

In a preferred embodiment of the present invention, the granules contain an effective amount of one or more corrosion inhibitors. Suitable corrosion inhibitors include, but are not limited to, mono-sodium phosphate, mono-ammonium phosphate, sodium nitrate and blends thereof.

In yet a more preferred embodiment, the granules are prepared from a compacted blend comprising from about 15 to about 45% by dry weight (more preferably from about 20 to about 25% by dry weight), based on the total dry weight of the compacted blend, of calcium chloride, from about 55 to about 85% by dry weight (more preferably from about 75 to about 80% by dry weight), based on the total dry weight of the compacted blend, of sodium chloride, and from about 1.0 to about 3.0% by dry weight (more preferably from about 1.15 to about 2.0% by dry weight), based on the total dry weight of the compacted blend, of mono-sodium phosphate.

The average particle size of the inventive granules preferably ranges from about 2 to about 10 millimeters (mm) (more preferably, from about 2 to about 8 mm), while the bulk density preferably ranges from about 0.88 to about 1.04 grams per cubic centimeter (g/cc$^3$) (from about 55 to about 65 pounds per cubic foot (lbs/ft$^3$)).

The snow and ice-melting granules of the present invention are prepared by mixing salts of alkali and/or alkaline earth metals, compacting the mixture, and granulating the compacted mixture. More specifically, the inventive granules are prepared by:

(a) mixing at least two salts of alkali and/or alkaline earth metals, wherein a first salt is an anhydrous, hygroscopic salt and wherein a second salt is in the form of a saturated salt solution having a free water content ranging from about 6 to about 10% by wt. (preferably from about 6 to about 7% by wt.), based on the total weight of the saturated salt solution;

(b) compacting the mixture; and (c) granulating the compacted mixture.

The term "free water content," as used herein, is intended to mean the total amount of unbound water present in solution and is measured in accordance with The American Society for Testing and Materials (ASTM) Standard Test Method Number E203-01.

By way of the present invention, it has been discovered that mixtures prepared from saturated salt solutions having a free water content of from about 6 to about 10% by wt., based on the total weight of the saturated salt solution, have improved compactability resulting in harder and more impact-resistant granules. In specific regard to calcium chloride/sodium chloride mixtures, such mixtures will contain greater than or equal to 20% by dry wt., based on the total dry weight of the mixture, of calcium chloride (dihydrate), which serves to bind the components resulting in improved compactability and thus harder granules. Mixtures prepared from saturated salt solutions containing greater than 10% by wt. free water, however, tend to form granules which are less effective in terms of melting snow and ice, while mixtures containing less than 3% by wt. free water tend to form granules which demonstrate reduced impact resistance.

In a preferred embodiment, the granules are prepared by mixing particulate calcium chloride with a saturated sodium chloride solution, compacting the mixture and granulating the compacted mixture. In accordance with this preferred embodiment, and as best shown in FIG. 1, particulate calcium chloride and a saturated solution of sodium chloride are forwarded by metered flow lines 10, 12 to mixer/reactor 14, and mixed or agitated at ambient or room temperature (i.e., from about 20 to about 25° C.), for a period of from about 20 to about 30 minutes.

The term "saturated solution," as used herein, is intended to mean a solution containing at least about 26% by weight, sodium chloride, based on the total weight of the solution.

During the mixing stage, additives (e.g., colorants, corrosion inhibitors) may be added to mixer/reactor 14, via metered flow line 16.

In a more preferred embodiment, aqueous suspensions or solutions of such additives are sprayed onto the mixture contained in mixer/reactor 14 using e.g. a spray nozzle.

In yet a more preferred embodiment, an aqueous solution containing from about 19 to about 38% by wt., based on the total weight of the aqueous solution, of mono-sodium phosphate, is added to mixer/reactor 14, via metered flow line 16.

Upon completion of the mixing stage, the mixture contained in mixer/reactor 14 is forwarded by flow line 18 to roll compactor 20 (e.g., a compactor employing smooth or corrugated rolls), which forms the mixture into a sheet. Preferably, pressures exerted by the rolls in compactor 20 do not exceed 13.1 megapascals (MPa). The formed sheet is forwarded along flow line 22 to breaker/granulator 24, which breaks and grinds the sheet into a granular product. It is noted that roll compactor 20 and breaker/granulator 24 may be contained in one piece of equipment so that the compaction and breaking/grinding steps are performed sequentially but in one unit.

The granular product formed in breaker/granulator 24 is forwarded by flow line 26 to screener 28 (e.g., a vibratory screener), which contains a series of screens. The granular product is separated into an oversized fraction, a product fraction and an undersized fraction, i.e., fines. The oversized fraction is removed via flow line 30 and recycled to granulator 32 for further size reduction. A second separate granulator may be used as well. The size-reduced fraction is then forwarded along flow lines 34 and 26 to screener 28. The undersized fraction is recycled via flow lines 36 and 18 to compactor 20. The product fraction is forwarded by flow line 38 for packaging. The granulated calcium chloride/sodium chloride or calcium chloride/sodium chloride/mono-sodium phosphate blend removed as product from screener 28 has an average particle size ranging from about 2 to about 10 mm (preferably from about 2 to about 8 mm) and is preferably stored in a cool, dry environment.

Figure 2:
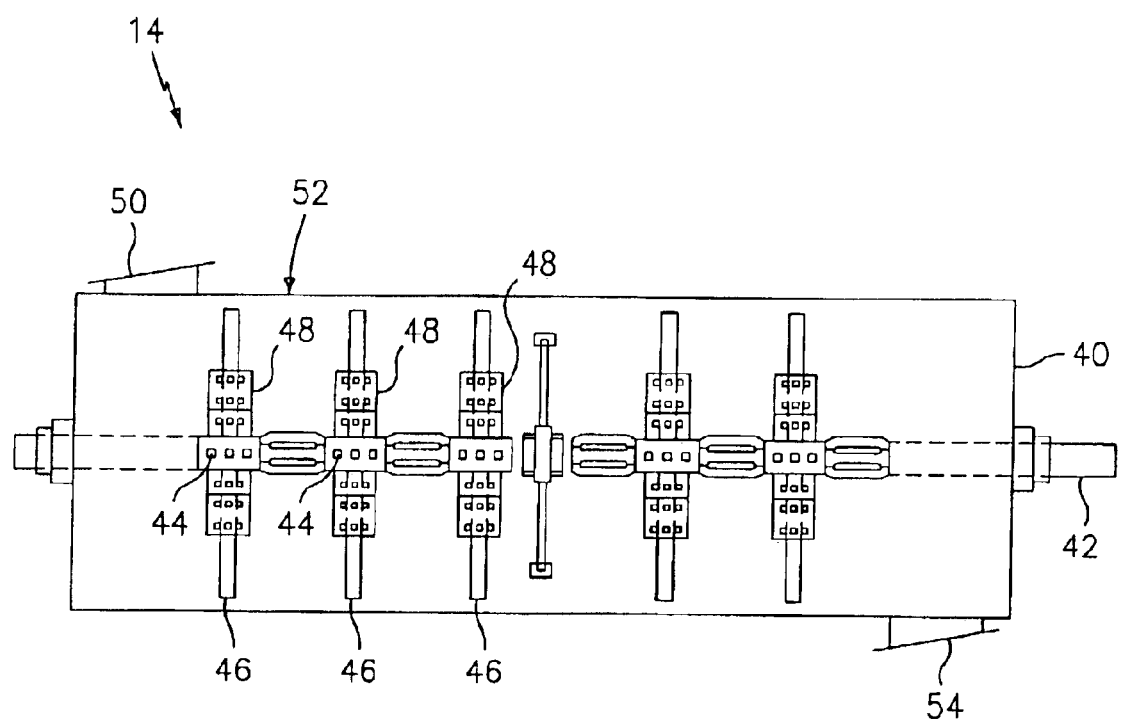
FIG. 2 is a cross-sectional, side view of a preferred embodiment of the mixer/reactor used to prepare one example of the snow and ice-melting granules of the present invention.

In a more preferred embodiment, and as best shown in FIG. 2, mixer/reactor 14 comprises: (a) a cylindrical housing 40; (b) a shaft 42, which is driven by a motor and gear box (not shown) and which is rotatably supported by bearings 44; and (c) a series of elements or mixing arms 46, which are connected to shaft 42 by radially-extending members 48.

Ingredients are feed into mixer/reactor 14 through inlet port 50, while additives (e.g., colorants, corrosion inhibitors) may be sprayed into mixer/reactor 14 using spray nozzle 52. The mixer/reactor 14 is tilted (e.g., 10° from the horizontal axis), which allows the mixture to flow by gravity toward discharge port 54.

As noted above, the snow and ice-melting granules of the present invention have improved mechanical properties. The inventive granules are hard and impact-resistant, and as such are not readily reduced to a powder when subjected to mechanical loadings during transit and storage.

Figure 3:
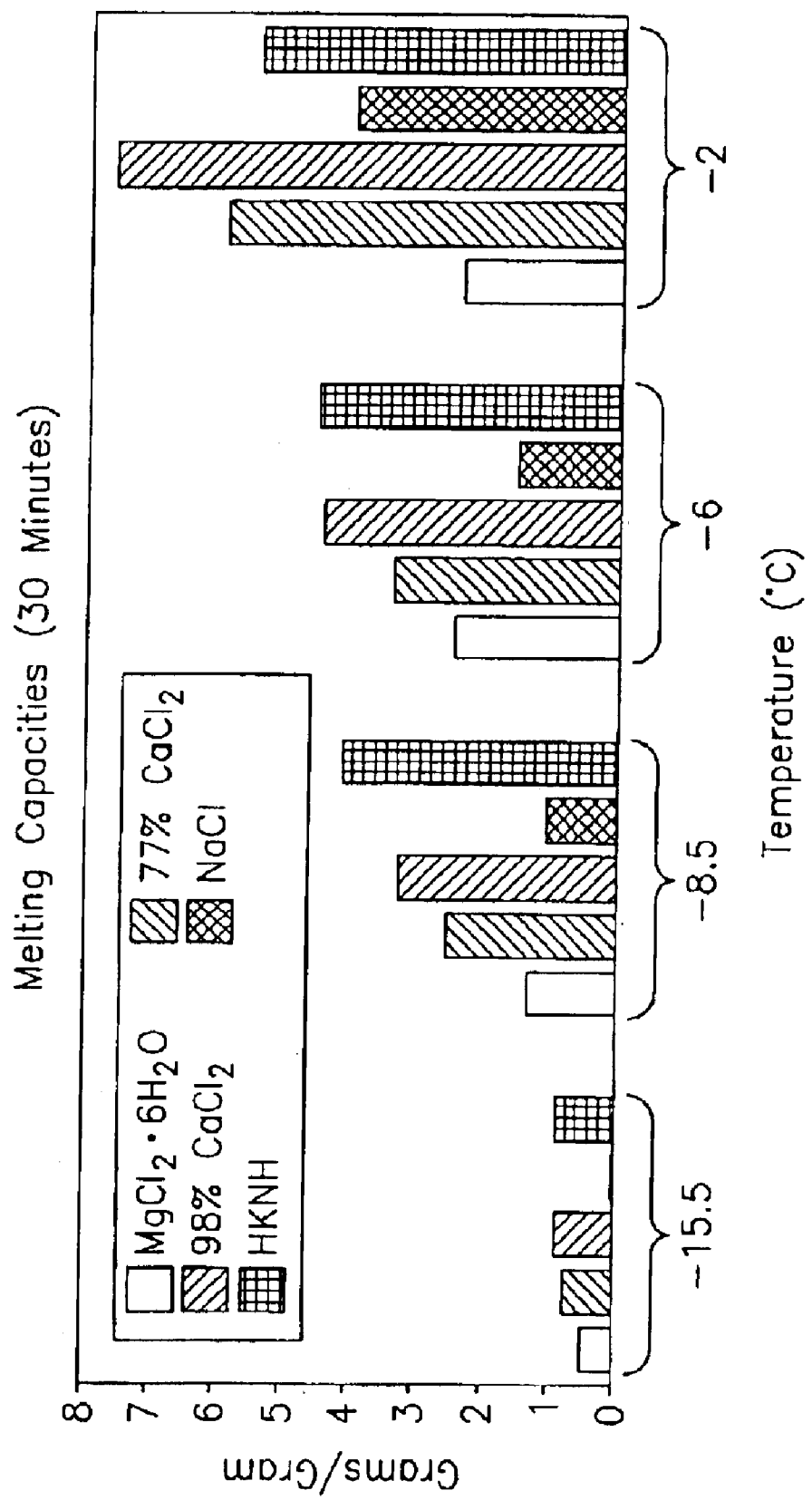
FIG. 3 is a chart depicting melting capacities for a preferred embodiment of the present invention and several prior art products.

When comparing the inventive granules to the salts of sodium, calcium and magnesium chlorides, the inventive granules demonstrated better overall melting capacity. More specifically, FIG. 3 is a chart depicting the melting capacity of a preferred embodiment of the present invention (labeled HKNH), sodium chloride, 98% calcium chloride, 77% calcium chloride and hydrated magnesium chloride. The term "melting capacity" refers to the grams of ice melted per gram of product at varying temperatures (as shown on the horizontal axis) in thirty (30) minutes.

For this test, distilled water was boiled, cooled and then placed in Plexiglas dishes having vertical sides, each dish measuring 230 square centimeters ($cm^2$) in total surface area. The dishes were then placed in a freezer for 15 hours, removed and the ice surface of each dish leveled by contacting the surface with an aluminum dish using circular motions. The dishes were then returned to the freezer until any surface water was re-frozen. A quantity of 1.0 gram of each test sample was then measured and cooled. The dishes were removed from the freezer and the measured and cooled test samples distributed uniformly across the ice therein, with each dish containing a different test sample. The mass and the volume of the melted ice present in each dish was measured at intervals of 15, 30, 45, 60 and 120 minutes. As shown in FIG. 3, the snow and ice-melting granules of the present invention had a better overall melting capacity than the other tested products at lower temperatures.

Figure 4:
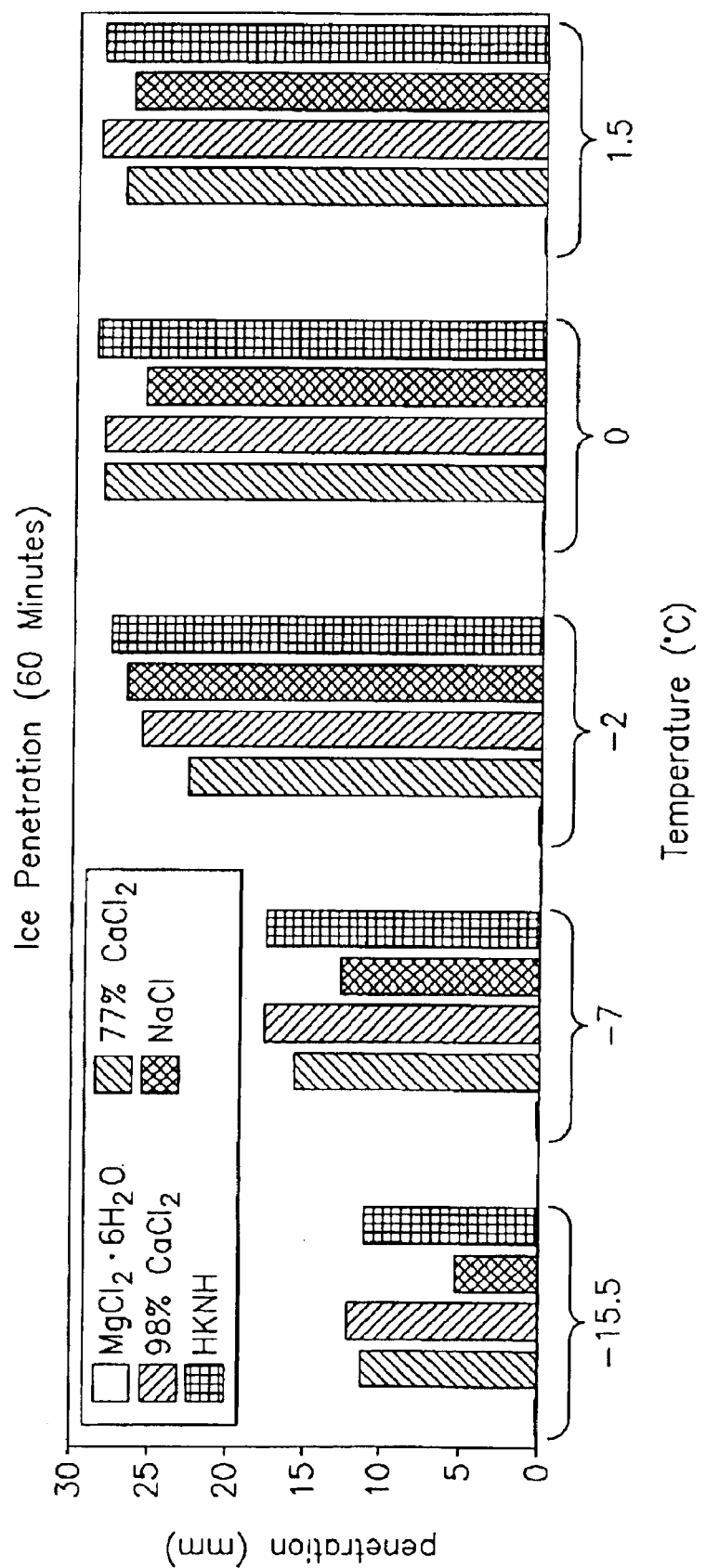
FIG. 4 is a chart showing the ice penetration for a preferred embodiment of the present invention compared to several prior art products.

FIG. 4 is a chart depicting the ice penetration in 60 minutes for the inventive granules and the salts of sodium, calcium and magnesium chlorides, which have been identified above. The term "ice penetration" refers to the amount of penetration of the product when placed on the surface of an ice-filled cavity.

For this test, devices containing a plurality of vertical cavities measuring 6 mm in diameter were used. Distilled water was boiled, cooled and then equal quantities thereof injected with a syringe into each cavity of each device. The devices were then placed in a freezer and the water frozen without the formation of air bubbles. Once frozen, so-called "ice caps" that formed on the surface of each cavity were removed using an aluminum plate and the devices returned to the freezer for one hour. A quantity of 0.04 grams of each test sample was then measured and cooled. The devices were removed from the freezer and the measured and cooled test samples placed on the ice therein, with each cavity containing a different test sample. The ice penetration depth realized by each test sample was measured at intervals of 15, 30, 45, 60 and 120 minutes. If a non-uniform penetration occurred, the maximum/minimum values were measured and the average value reported. As shown in FIG. 4, the snow and ice-melting granules of the present invention demonstrated either an increase in, or similar ice penetrations when compared to the other products.

The inventive granules, as noted above, preferably employ one or more corrosion inhibitors homogeneously distributed throughout each granule. There are a number of corrosion tests developed by organizations such as the American Society for Testing and Materials (ASTM) and the National Association of Corrosion Engineers (NACE). These tests can be quite complex in that the test conditions and metals must approximate those experienced in practice.

Corrosion testing was performed on the snow and ice-melting granules of the present invention according to the NACE Standard TM-01-69 (1976 rev.), Pacific Northwest States (PNS) modified. PNS modified this corrosion test procedure so that the test procedure used 30 milliliters (ml) of a 3% test product (or brine) solution per square inch of metal sample surface area.

Corrosion inhibited snow and ice-melting products must have a corrosion value of at least 70% less than sodium chloride (salt) to be acceptable, according to the NACE Standard. Thus, where the corrosion rate for dilute salt solutions (3% by weight) for iron-based metals is 17 to 50 mils per year (MPY), an acceptable standard for a corrosion resistant snow and ice-melting product would be between 5.10 to 15.00 MPY.

In accordance with the above-referenced test procedure, metal samples or coupons were cleaned, dried and weighed. Then, the coupons were alternately dipped in brine solution (10 minutes) and pulled out of the brine solution and exposed to air (50 minutes) for 72 hours. Next, the coupons were inspected and weighed to determine how much metal was lost or corroded. The coupons were ½ inch (approximately 1.38 inches×0.56 inch×0.11 inch) flat mild steel washers having a density of approximately 7.85 grams per cubic centimeter (g/cm$^3$).

The corrosion test results obtained for the snow and ice-melting granules of the present invention indicated a corrosion rate of less than or equal to 10 MPY, preferably less than or equal to 8 MPY. As will be readily appreciated, the inventive granules will be in contact with roadways and thus motor vehicles, and as such a low corrosion rate is extremely advantageous and desirable.

Although this invention has been shown and described with respect to detailed embodiments thereof, it will be understood by those skilled in the art that various changes in form and detail thereof may be made without departing from the spirit of the claimed invention.

Having thus described the invention, what is claimed is:

1. A compacted blend of salts of alkali and/or alkaline earth metals, wherein the blend comprises: from about 15 to about 45% by dry weight, based on the total dry weight of the compacted blend, of a first alkali or alkaline earth metal salt; and from about 85 to about 55% by dry weight, based on the total dry weight of the compacted blend, of a second alkali or alkaline earth metal salt, wherein, at least the first salt is an anhydrous, hygroscopic salt, and wherein, the sum of the components total 100% by dry weight.

2. The compacted blend of claim 1, wherein the first alkali or alkaline earth metal salt is a halide salt selected from the group consisting of calcium chloride and magnesium chloride, and wherein the second alkali or alkaline earth metal salt is a halide salt selected from the group consisting of potassium chloride and sodium chloride.

3. The compacted blend of claim 2, wherein the first alkali or alkaline earth metal salt is calcium chloride and wherein the second alkali or alkaline earth metal salt is sodium chloride.

4. The compacted blend of claim 3, which comprises from about 20 to about 25% by dry weight, based on the total dry weight of the compacted blend, of calcium chloride; and from about 80 to about 75% by dry weight, based on the total dry weight of the compacted blend, of sodium chloride.

5. The compacted blend of claim 4, which comprises from about 20 to about 22% by dry weight, based on the total dry weight of the compacted blend, of calcium chloride; and from about 80 to about 78% by dry weight, based on the total dry weight of the compacted blend, of sodium chloride.

6. The compacted blend of claim 1, which further comprises one or more corrosion inhibitors.

7. The compacted blend of claim 6, wherein the one or more corrosion inhibitors are selected from the group consisting of mono-sodium phosphate, mono-ammonium phosphate, sodium nitrate and blends thereof.

8. The compacted blend of claim 7, wherein the one or more corrosion inhibitors is mono-sodium phosphate.

9. The compacted blend of claim 8, which further comprises from about 1.0 to about 3.0% by dry weight, based on the total dry weight of the compacted blend, of mono-sodium phosphate.

10. Snow and ice-melting granules prepared from a compacted blend of salts of alkali and/or alkaline earth metals, wherein the blend comprises: from about 15 to about 45% by dry weight, based on the total dry weight of the compacted blend, of a first alkali or alkaline earth metal salt; and from about 85 to about 55% by dry weight, based on the total dry weight of the compacted blend, of a second alkali or alkaline earth metal salt, wherein, at least the first salt is an anhydrous, hygroscopic salt, and wherein, the sum of the components total 100% by dry weight.

11. The snow and ice-melting granules of claim 10, wherein the granules have an average particle size ranging from about 2 to about 10 millimeters and a bulk density ranging from about 0.88 to about 1.04 grams per cubic centimeter.

12. The snow and ice-melting granules of claim 10, which further comprise one or more corrosion inhibitors.

13. The snow and ice-melting granules of claim 12, which demonstrate a corrosion rate of less than or equal to 10 mils per year, when tested in accordance with NACE Standard TM-01-69 (1976 rev.), PNS modified.

14. The snow and ice-melting granules of claim 13, which demonstrate a corrosion rate of less than or equal to 8 mils per year, when tested in accordance with NACE Standard TM-01-69 (1976 rev.), PNS modified.

15. A method for preparing snow and ice-melting granules, which comprises:
(a) mixing at least two salts of alkali and/or alkaline earth metals and optionally, one or more corrosion inhibitors, wherein a first salt is an anhydrous, hygroscopic salt and wherein a second salt is in the form of a saturated salt solution having a free water content ranging from about 6 to about 10% by wt., based on the total weight of the saturated salt solution;
(b) compacting the mixture; and
(c) granulating the compacted mixture.

16. The method of claim 15, wherein the saturated salt solution has a free water content ranging from about 6 to about 7% by wt., based on the total weight of the saturated salt solution.

17. The method of claim 15, wherein one or more corrosion inhibitors selected from the group consisting of mono-sodium phosphate, mono-ammonium phosphate, sodium nitrate and blends thereof, are mixed with the at least two salts of alkali and/or alkaline earth metals.

18. The method of claim 17, wherein the one or more corrosion inhibitors is mono-sodium phosphate.

19. Snow and ice-melting granules prepared from a compacted blend comprising: from about 15 to about 45% by dry weight, based on the total dry weight of the compacted blend, of a first alkali or alkaline earth metal salt; from about 85 to about 55% by dry weight, based on the total dry weight of the compacted blend, of a second alkali or alkaline earth metal salt; and optionally, one or more corrosion inhibitors, wherein at least the first salt is an anhydrous, hygroscopic salt, wherein, the sum of the components total 100% by dry weight, and wherein, the compacted blend is prepared by:
(a) mixing the salts and optionally, the one or more corrosion inhibitors, wherein the first salt is in the form of an anhydrous, hygroscopic salt and wherein the second salt is in the form of a saturated salt solution having a free water content ranging from about 6 to about 10% by wt., based on the total weight of the saturated salt solution;
(b) compacting the mixture; and
(c) granulating the compacted mixture.

20. Snow and ice-melting granules prepared from a compacted blend comprising: from about 20 to about 25% by dry weight, based on the total dry weight of the compacted blend, of anhydrous, hygroscopic calcium chloride; and from about 80 to about 75% by dry weight, based on the total dry weight of the compacted blend, of sodium chloride, wherein, the sum of the components total 100% by dry weight, and wherein, the compacted blend is prepared by:

(a) mixing the salts, wherein the calcium chloride is in the form of an anhydrous, hygroscopic salt and wherein the sodium chloride is in the form of a saturated salt solution having a free water content ranging from about 6 to about 10% by wt., based on the total weight of the saturated salt solution;

(b) compacting the mixture; and (c) granulating the compacted mixture.

21. Snow and ice-melting granules prepared from a compacted blend comprising: from about 20 to about 25% by dry weight, based on the total dry weight of the compacted blend, of calcium chloride; from about 80 to about 75% by dry weight, based on the total dry weight of the compacted blend, of sodium chloride; and from about 1.0 to about 3.0% by dry weight, based on the total dry weight of the compacted blend, of mono-sodium phosphate, wherein, the sum of the components total 100% by dry weight, and wherein, the compacted blend is prepared by:

(a) mixing the salts and the mono-sodium phosphate, wherein the calcium chloride is in the form of an anhydrous, hygroscopic salt, wherein the sodium chloride is in the form of a saturated salt solution having a free water content ranging from about 6 to about 10% by wt., based on the total weight of the saturated salt solution, and wherein the mono-sodium phosphate is in the form of an aqueous solution comprising from about 19 to about 38% by weight, based on the total weight of the aqueous solution, of mono-sodium phosphate;

(b) compacting the mixture; and (c) granulating the compacted mixture.

22. Snow and ice-melting granules prepared from a compacted blend of salts of alkali and/or alkaline earth metals, wherein the blend comprises: from about 15 to about 45% by dry weight, based on the total dry weight of the compacted blend, of a first alkali or alkaline earth metal salt; from about 85 to about 55% by dry weight, based on the total dry weight of the compacted blend, of a second alkali or alkaline earth metal salt; and one or more corrosion inhibitors, wherein at least the first salt is a hygroscopic salt, wherein the sum of the components total 100% by dry weight, and wherein the snow and ice-melting granules demonstrate a corrosion rate of less than or equal to 10 mils per year, when tested in accordance with NACE Standard TM-01-69 (1976 rev.), PNS modified.

23. Snow and ice-melting granules prepared from a compacted blend of salts of alkali and/or alkaline earth metals, wherein the blend comprises: from about 15 to about 45% by dry weight, based on the total dry weight of the compacted blend, of a first alkali or alkaline earth metal salt; from about 85 to about 55% by dry weight, based on the total dry weight of the compacted blend, of a second alkali or alkaline earth metal salt; and one or more corrosion inhibitors, wherein at least the first salt is a hygroscopic salt, wherein the sum of the components total 100% by dry weight, and wherein the snow and ice-melting granules demonstrate a corrosion rate of less than or equal to 8 mils per year, when tested in accordance with NACE Standard TM-01-69 (1976 rev.), PNS modified.

* * * * *